United States Patent [19]

Ambrose

[11] Patent Number: 5,030,344
[45] Date of Patent: Jul. 9, 1991

[54] MAGNETIC FLUID CONDITIONER

[75] Inventor: Randy Ambrose, Costa Mesa, Calif.

[73] Assignee: H.K. Research & Development, Inc., Philadelphia, Pa.

[21] Appl. No.: 383,624

[22] Filed: Jul. 24, 1989

[51] Int. Cl.⁵ .............................................. C02F 1/48
[52] U.S. Cl. ..................................... 210/222; 55/100
[58] Field of Search ....................... 210/222, 695, 223; 55/100; 335/306; 209/223.1, 223.2

[56] References Cited

U.S. PATENT DOCUMENTS

| | | | |
|---|---|---|---|
| 3,710,291 | 1/1973 | Nicoud | 335/306 |
| 3,980,562 | 9/1976 | Nilsson | 210/222 |
| 4,367,143 | 1/1983 | Carpenter | 210/222 |
| 4,486,729 | 12/1984 | Lee | 335/306 |
| 4,568,901 | 2/1986 | Adam | 210/222 |
| 4,572,145 | 2/1986 | Mitchell et al. | 210/222 |
| 4,605,498 | 8/1986 | Kulish | 210/222 |

FOREIGN PATENT DOCUMENTS 1155086 10/1983 Canada .................................. 210/222

Primary Examiner—Robert A. Dawson
Assistant Examiner—Matthew O. Savage
Attorney, Agent, or Firm—Morland C. Fischer

[57] ABSTRACT

A compact, low cost magnetic fluid conditioner to be removably attached at one side of a pipe through which a fluid (e.g. water, fuel, or the like) is conveyed. Two pairs of ceramic bar magnets are arranged within the conditioner in a 2×2 array. Each magnet is positioned so that its south magnetic pole is facing towards the fluid carrying pipe. Accordingly, a longitudinally extending magnetic field will be generated having concentrated lines of flux which penetrate the pipe and influence a relatively large volume of fluid passing therethrough per unit of time. In the case where the fluid is water, the magnetic field applied by the conditioner acts to soften the water, improve the taste, and lessen the possibility of damage to the interior of the pipe along which the water passes.

6 Claims, 4 Drawing Sheets

MAGNETIC FLUID CONDITIONER

BACKGROUND OF THE INVENTION

1. Field of the Invention

This invention relates to a magnetic fluid conditioner which, in the case where the fluid is water, functions as a low cost and compact water softener.

2. Background Art

Magnetic fluid conditioners are known in the art for treating a fluid, such as water, which is carried by a pipe. Some magnetic water conditioners are designed to extend completely around the circumference of the pipe. In cases where the pipe runs adjacent to the wall, access to the complete pipe circumference may not be possible. In other cases, a plurality of magnetic conditioners may have to be coupled together to surround the pipe so that a magnetic field of sufficient magnitude is available to penetrate the pipe. However, where sections of a magnetic conditioner lie in face-to-face alignment with one another at opposite sides of the pipe, opposing magnetic fields are created which produce a dead zone at the intersection therebetween. Consequently, water which travels through this dead zone may not be magnetically treated, whereby the efficiency and effectiveness of such a conditioner is adversely effected. Likewise, where a plurality of magnetic conditioners or conditioner sections must be coupled together around a pipe, the cost, complexity and difficulty of installation may all be undesirably increased.

Examples of conventional magnetic fluid conditioners are available by referring to one or more of the following U. S. Pat. Nos.:

| | |
|---|---|
| 4,367,143 | January 4, 1983 |
| 4,568,901 | February 4, 1986 |
| 4,572,145 | February 25, 1986 |
| 4,605,498 | August 12, 1986 |

It would be more desirable to have available a low cost, compact fluid conditioner, which may be easily attached along one side of a fluid carrying pipe so as to uniformly treat a relatively large volume of the fluid which is carried by said pipe.

SUMMARY OF THE INVENTION

In general terms, a low cost, compact magnetic fluid conditioner is disclosed for treating a fluid (e.g. water, fuel, or the like) that is carried by a pipe. The conditioner is provided with an arcuate surface against which the pipe is received to establish a flush fit therebetween. A pair of outwardly extending straps or belts is provided to releasably attach the conditioner to one side of the pipe.

The conditioner includes a generally hollow, non-magnetic housing in which a 2×2 array of magnets is retained. In a preferred embodiment, the magnets are high intensity CB-60 ceramic bar magnets formed from powdered barium ferrite. Each bar magnet is aligned so that the south magnetic pole thereof is facing the fluid carrying pipe. Accordingly, a relatively intense magnetic field is created with concentrated lines of flux that penetrate the pipe and treat a relatively large volume of fluid per unit of time. In the case where the fluid is water, the fluid conditioner functions as a water softener that reduces hardness, improves taste and minimizes the possibility of damage to the interior of the pipe.

DESCRIPTION OF THE PREFERRED EMBODIMENT

Figure 1:
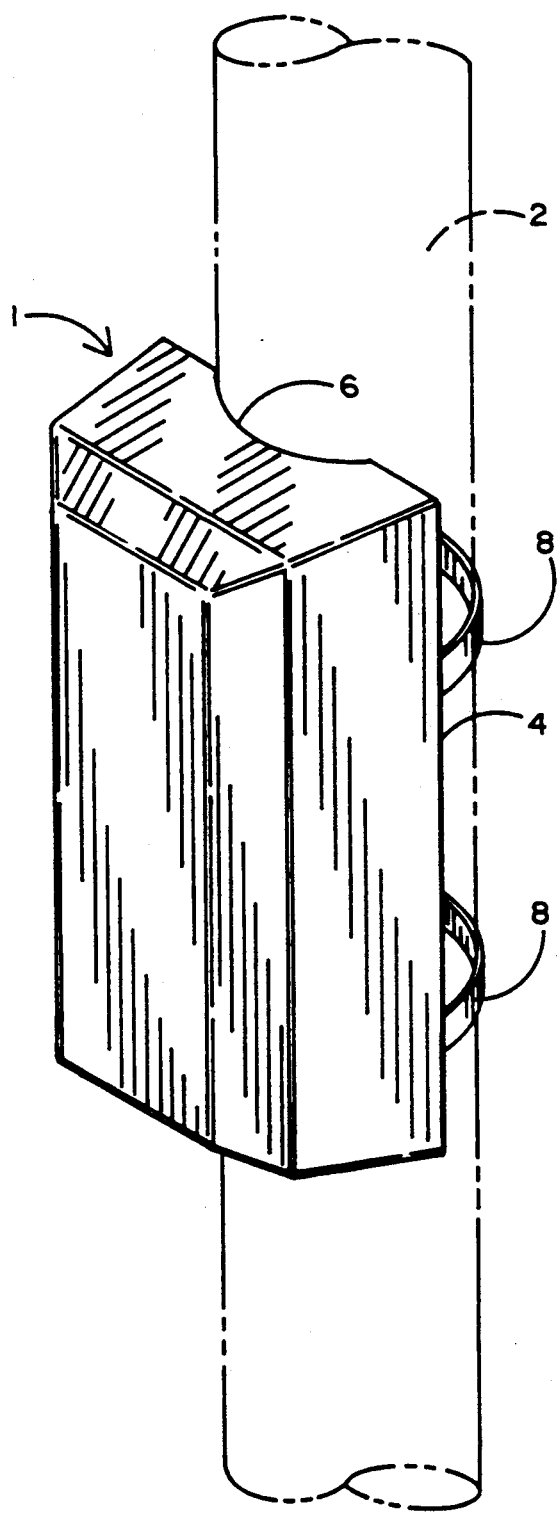
FIG. 1 shows the magnetic fluid conditioner which forms the present invention removably attached to one side of a fluid carrying pipe.

The compact, low cost magnetic fluid conditioner which forms the present invention is best described while referring to the drawings, where FIG. 1 shows the fluid conditioner 1 removably attached to a fluid carrying pipe 2. The pipe 2 with which conditioner 1 is to be associated may convey any suitable fluid, such as, but not limited to, water or fuel. In the aforementioned cases, fluid conditioner 1 may be regarded as a water softener or fuel conditioner, respectively. However, the type of fluid traveling through pipe 2 is not to be regarded as a limitation of the present invention.

Figure 2:
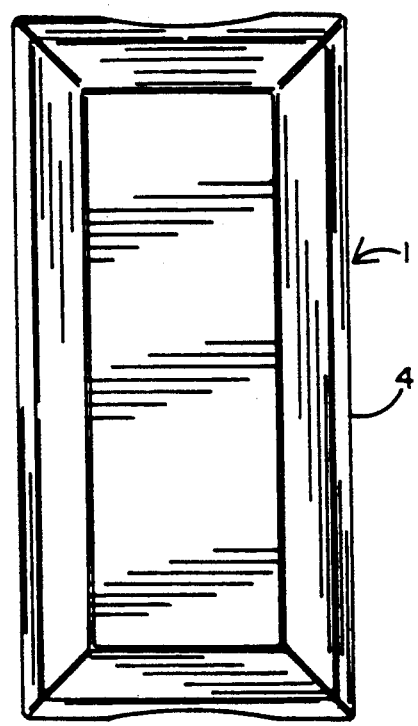
FIG. 2 is a top view of the magnetic fluid conditioner of FIG. 1.
Figure 3:
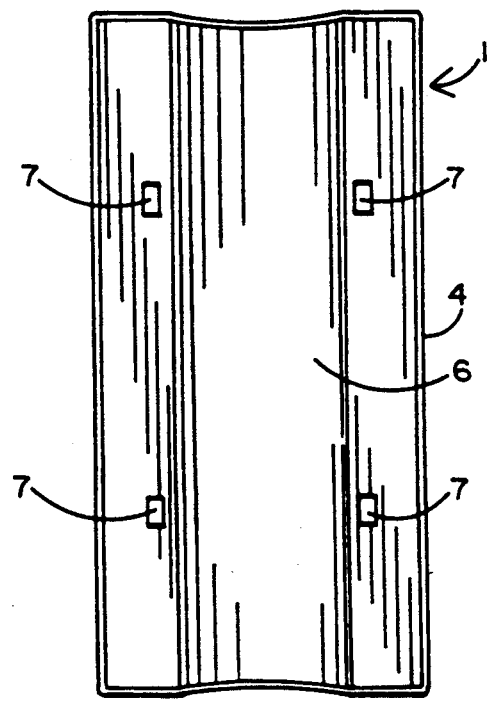
FIG. 3 is a bottom view of the fluid conditioner of FIG. 1.

As is best shown in FIGS. 1-3 of the drawings, fluid conditioner 1 is characterized by a generally rectangular housing 4. It is preferable that the housing 4 be manufactured from a non-magnetic material, such as molded plastic. One side of housing 4 includes an arcuate-shaped pipe receiving section 6, within which to locate the fluid pipe 2. The precise curvature of arcuate pipe receiving surface 6 may vary from housing to housing depending upon the diameter of the pipe 2. However, by virtue of pipe receiving surface 6, a relatively flush and stable fit is possible between fluid conditioner 1 and fluid pipe 2. While the appearance of fluid conditioner 1 and, more particularly, the continuous surface-to-surface contact established between the pipe receiving surface 6 and the fluid pipe 2, is considered to be unique, such appearance forms no part of the claimed invention, inasmuch as the aforementioned appearance of fluid conditioner 1 is disclosed and claimed in co-pending U.S. Design Pat. application No. 313,537 filed Feb. 21, 1989.

Figure 5:
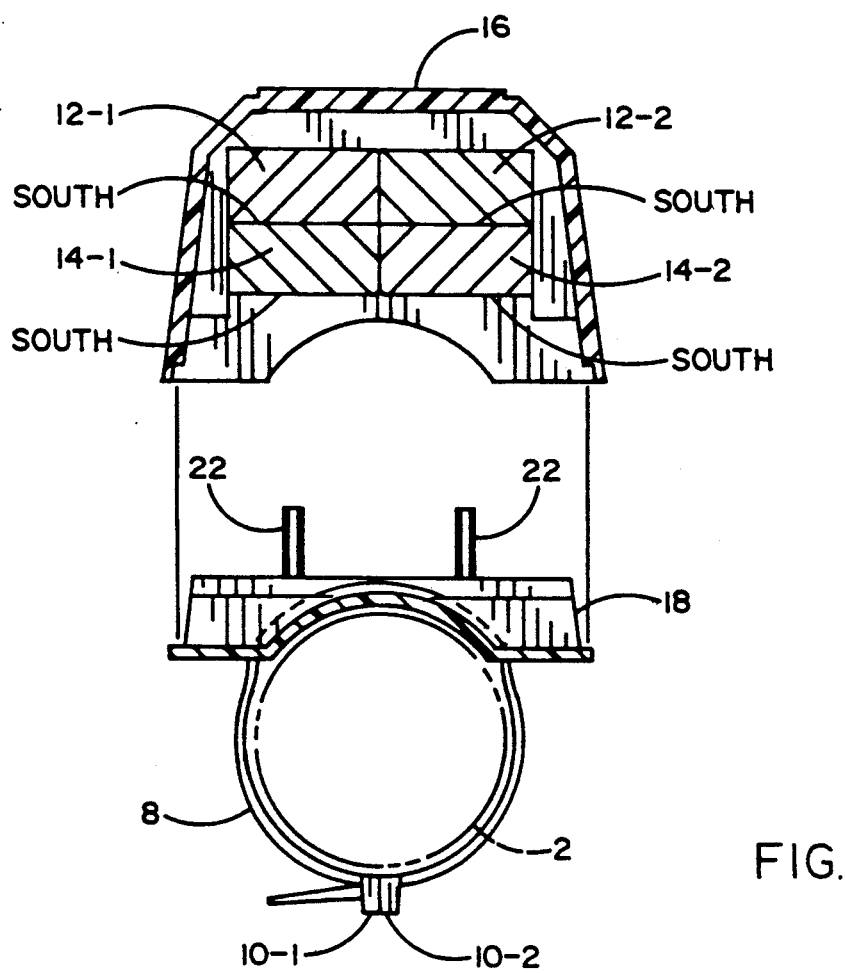
FIGS. 5 and 6 are cross-sections of the fluid conditioner showing cover and shell housing members being connected together with the bar magnets of FIG. 4 installed within said housing shell.
Figure 6:
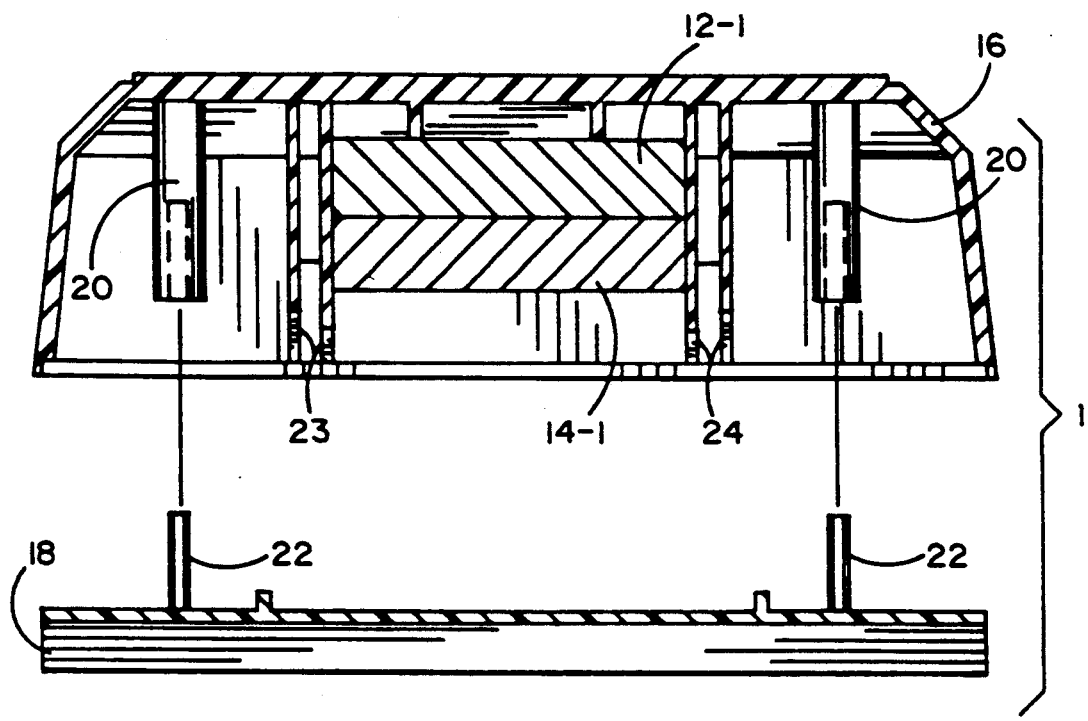
Figure 7:
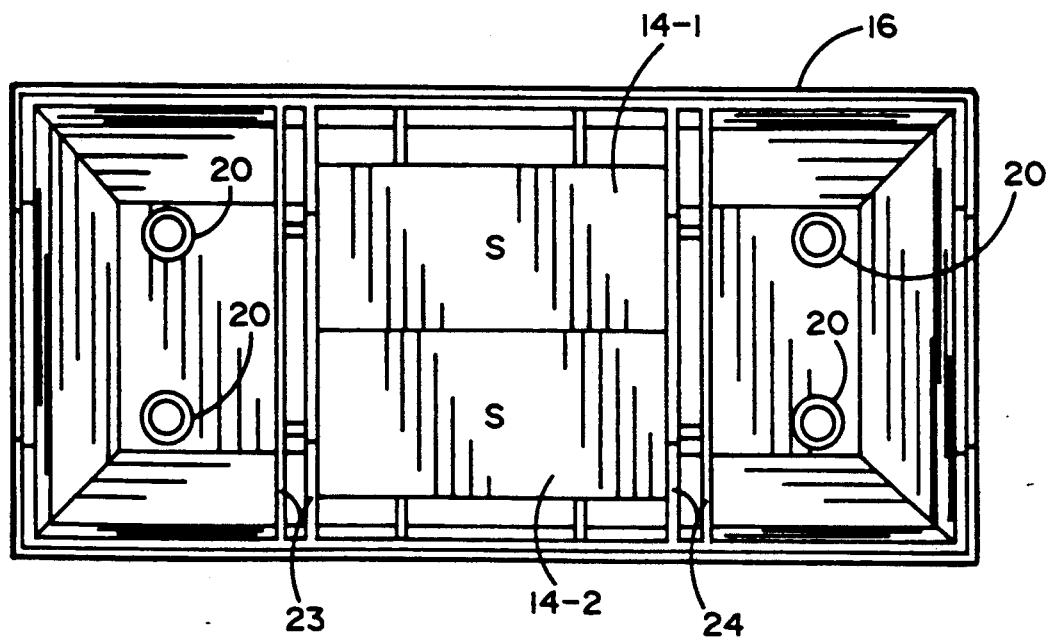
FIG. 7 is a bottom view of the shell housing member showing the bar magnets of FIG. 4 received therewithin.
Figure 8:
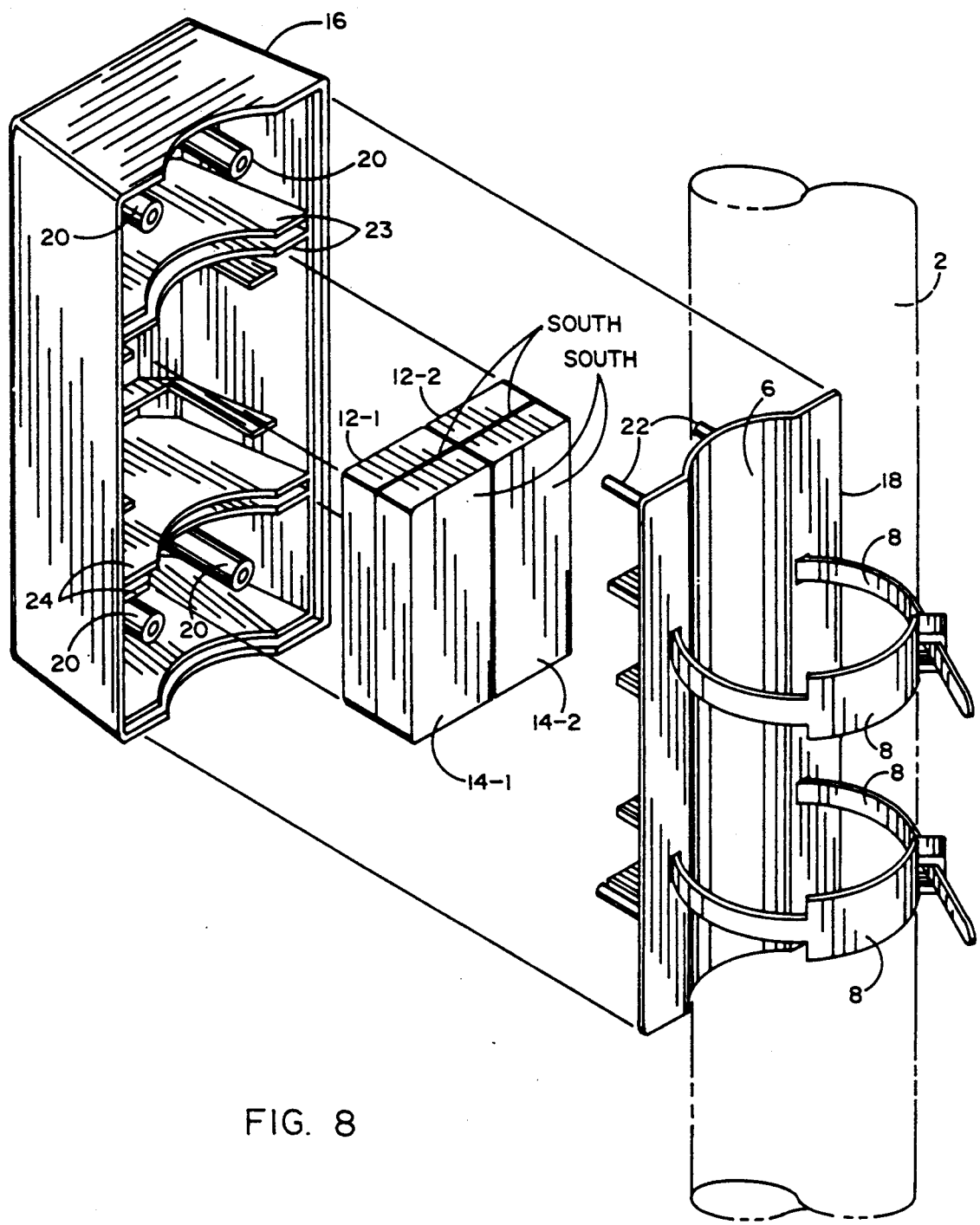
FIG. 8 is an exploded view of the magnetic fluid conditioner which forms the present invention relative to a fluid carrying pipe.

Fluid conditioner 1 includes means for conveniently attaching the housing 4 to fluid pipe 2. The attachment means includes a pair of thin straps or belts 8 which extend through slots 7 at each of the opposite ends of the conditioner 1 so as to surround pipe 2. The ends of the straps 8 include a complementary pair of fasteners (designated 10-1 and 10-2 in FIG. 5) which may be mated (e.g. snap-fit) together so as to reliably attach housing 4 to pipe 2. When it is desirable to remove the conditioner 1 from pipe 2, fasteners 10-1 and 10-2 are merely disconnected from one another.

Figure 4:
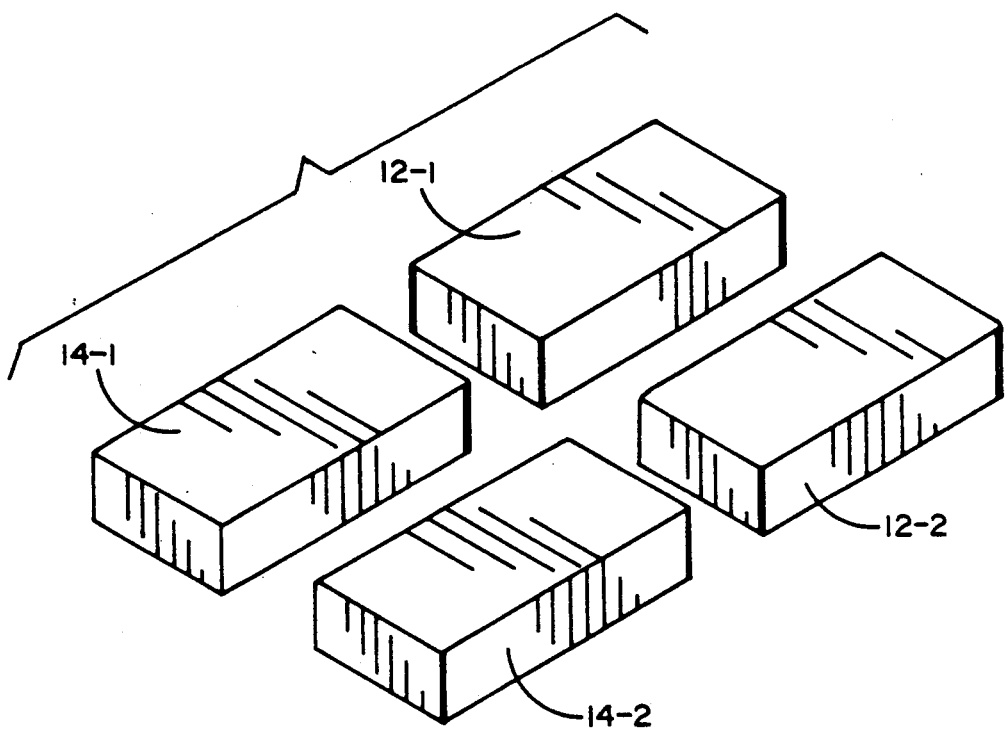
FIG. 4 illustrates two pairs of bar magnets which are to be received within the fluid conditioner.

In accordance with the present invention, and referring to FIG. 4 of the drawings, magnetic means are described by which to enable fluid conditioner 1 to generate a sufficient magnetic field that is characterized by lines of flux that will penetrate the fluid carrying pipe and thereby influence the fluid passing therethrough. More particularly, two pairs of rectangular bar magnets 12-1, 12-2 and 14-1, 14-2 are arranged within conditioner 1 in a particular alignment relative to one another to generate the magnetic field and associated flux pattern that will penetrate the fluid carrying pipe along the longitudinal axis of said pipe so as to influence a relatively large volume of fluid passing through the pipe at any instant of time. By way of example, magnets 12 and 14 which are suitable for use in fluid conditioner 1 are high intensity CB-60 ceramic magnets. As will be understood by those skilled in the art, CB-60 refers to a ceramic magnet rated grade 8 and composed of powdered barium ferrite, wet pressed and ground to size. Such magnets are commercially available from All Magnetics, Inc. of Placentia, Ca.

The particular alignment of bar magnets 12-1, 12-2 and 14-1, 14-2 relative to one another and the installation of such magnets into the housing 4 of fluid conditioner 1 are now described while referring concurrently to FIGS. 5-8 from the drawings. In order to accommodate the magnets 12 and 14 in the desired alignment, the housing of the conditioner 1 is provided with a generally hollow housing shell 16 having one open end and a detachable housing cover 18, one side of which having the arcuate pipe retaining surface (designated 6 and best shown in FIG. 8). A pair of hollow sleeves 20 extends outwardly from each end of housing shell 16. A pair of legs 22 extends outwardly from each end of the housing cover 18 in suitable alignment with respective sleeves 20. In the assembled arrangement, each leg 22 of cover 18 is received within and mated to a respective hollow sleeve 20 of shell 16 so as to reliably attach cover 18 across the open end of said shell.

Pairs of longitudinally spaced retaining walls 23 and 24 extend in parallel alignment with one another across the interior of hollow housing shell 16. The pairs of bar magnets 12-1, 12-2 and 14-1, 14-2 are received in a particular predetermined alignment between the pairs of retaining walls 23 and 24 during the assembly of conditioner 1 and prior to the attachment of housing cover 18 to housing shell 16. Magnets 12 and 14 are sized to form a snug, friction fit against retaining walls 23 and 24 so as to prevent a displacement of the magnets out of their predetermined alignment.

The details of the particular alignment of bar magnets 12-1, 12-2 and 14-1, 14-2 are now disclosed. It has been found that a magnetic field can be generated along the longitudinal axis of fluid carrying pipe 2 with concentrated lines of flux that penetrate said pipe and influence a relatively large volume of fluid traveling therethrough by arranging the magnets, in a $1 \times 2$, or in a $2 \times 2$ array so as to touch one another with all of the south magnetic poles facing towards pipe 2 (best illustrated in FIGS. 5 and 8). That is, the first pair of magnets 12-1 and 12-2 are arranged side-by-side so as to repel one another atop the second pair of magnets 14-1 and 14-2, which are also arranged side-by-side so as to repel one another. Each magnet of the first and second pairs thereof is positioned within the fluid conditioner 1 so that its south magnetic pole faces towards the fluid pipe 2 and its north magnetic pole faces away from fluid pipe 2.

By virtue of the foregoing magnetic alignment, it has been found that with water passing through pipe 2, the applied magnetic field acts to reduce hardness. More particularly, chlorine and sulphur particles in water remain soluable, while charged mineral particles remain in solution. Moreover, mineral scale is attracted from the walls of the pipe back into a dissolved state. What is more, metal particles are less likely to be stripped from lead pipes. Accordingly, the water should be softer and should taste better while being less likely to damage the inside of the pipe through which it passes. Because the preferred alignment of magnets 12-1, 12-2 and 14-1, 14-2 produces a magnetic field having concentrated lines of flux that penetrate the fluid carrying pipe 2, it may be noted that only a single fluid conditioner 1 is needed for attachment along one side of the pipe. This is particularly advantageous in situations where the pipe is located adjacent a wall and access to the complete periphery of the pipe is not possible. Of course, it is still in the scope of the present invention to attach more than one fluid conditioner to said pipe when complete access thereto is otherwise available.

It will be apparent that while a preferred embodiment of the invention has been shown and described, various modifications and changes may be made without departing from the true spirit and scope of the invention. Having thus set forth a preferred embodiment of the invention, what is claimed is:

1. A fluid conditioner to be located adjacent a conduit in which a fluid is carried, said conditioner including a housing having a hollow compartment and magnet means located within said compartment, means associated with said housing for removably attaching said housing to the fluid carrying conduit, said magnet means comprising at least two rectangular shaped magnets, each having north and south magnetic poles at the respective opposite faces thereof and being aligned side-by-side and touching one another in a first $1 \times 2$ matrix that is retained within the compartment of said housing such that said magnets act to magnetically repel one another, whereby the respective south magnetic poles of said magnets face the conduit to generate a magnetic field having relatively dense lines of flux which penetrate said conduit.

2. The fluid conditioner recited in claim 1, wherein each of said at least two rectangular magnets is a bar magnet having a longitudinally extending axis, whereby said bar magnets can be arranged relative to the conduit, such that the longitudinally extending axes of said magnets are aligned parallel with respect to the direction in which fluid passes through said conduit.

3. The fluid conditioner recited in claim 1, wherein said magnet means also includes two additional rectangular shaped magnets, each having north and south magnetic poles at the respective opposite faces thereof and aligned side-by-side and touching one another in a second $1 \times 2$ matrix such that said two additional magnets act to magnetically repel one another, said second $1 \times 2$ matrix of magnets being retained within the compartment of said housing on top of and in contact with said first matrix of $1 \times 2$ magnets to form a $2 \times 2$ matrix of magnets, whereby the respective south magnetic poles of each of said magnets face the fluid carrying conduit.

4. The fluid conditioner recited in claim 1, wherein each of said at least two magnets is formed from a ceramic material.

5. The fluid conditioner recited in claim 4, wherein the ceramic material is barium ferrite.

6. The fluid conditioner recited in claim 1, wherein said means for attaching includes at least one strap connected to said housing to extend around the fluid carrying conduit.

* * * * *